Nov. 13, 1956 R. G. HAAGENS ET AL 2,770,785

DIRECTLY-COOLED ELECTROMAGNETIC COMPONENTS

Filed Jan. 29, 1953 2 Sheets-Sheet 1

INVENTORS
ROBERT G. HAAGENS
LEONHARD KATZ

BY Elmer J. Gorn

ATTORNEY

Nov. 13, 1956 R. G. HAAGENS ET AL 2,770,785
DIRECTLY-COOLED ELECTROMAGNETIC COMPONENTS
Filed Jan. 29, 1953 2 Sheets-Sheet 2

INVENTORS
ROBERT G. HAAGENS
LEONHARD KATZ
BY Elmer J. Gorn
ATTORNEY

United States Patent Office 2,770,785

Patented Nov. 13, 1956

2,770,785

DIRECTLY-COOLED ELECTROMAGNETIC COMPONENTS

Robert G. Haagens, Concord, and Leonhard Katz, Woburn, Mass., assignors to Raytheon Manufacturing Company, Newton, Mass., a corporation of Delaware Application January 29, 1953, Serial No. 333,954

4 Claims. (Cl. 336—61)

In many types of electronic equipment, space is of the essence so that the trend is toward miniaturization of components. The size of conventionally designed electromagnetic components, such as transformers, chokes, magnetic amplifiers, magnetic delay lines, and so forth, is largely dictated by the power rating of the components. In order to prevent an electromagnetic component from overheating or burning out, it is ordinarily designed to be large enough so that its mass can transmit the heat from the hot spots within the component to an ambient region external to the component. In addition, the greater the surface area of the component, the better is the heat transfer by convection and radiation.

The main difficulty in reducing the size of such components has been the increased concentration of heat in the smaller components and a consequent damage or failure thereof.

Efforts in the past have been directed toward utilization of new types of insulation capable of withstanding higher temperatures. The final heat removal is still left to conventional means. In many applications, however, the components still fail because of the relatively high temperatures encountered and because the heat cannot be removed adequately from the component.

By cooling the hot spots within the component directly, however, the component may be reduced in size and weight, or may have a greater power output for a given weight.

In accordance with this invention, highly conductive thermal paths are introduced into the electromagnetic components in various ways such that the heat is transported away from the source where it is generated directly to a mounting surface. Heat removal from this mounting surface may then be accomplished by means of a heat transfer medium of relatively large thermal conductivity and surface area.

In a first embodiment of the invention, the magnetic core of the electromagnetic component is cooled by inserting laminations having a relatively high thermal conductivity between the core laminations and connecting these thermally-conductive laminations to a heat conductor which also serves as a mounting base for installation on a cooling plate.

In a second embodiment, a cooling layer of thermally-conductive material is introduced between the windings of each coil assembly in addition to the thermally-conductive laminations in the magnetic core.

In a third embodiment, the cooling conductors or laminations are concentrated on the windings surrounding the magnetic core.

Figure 1:
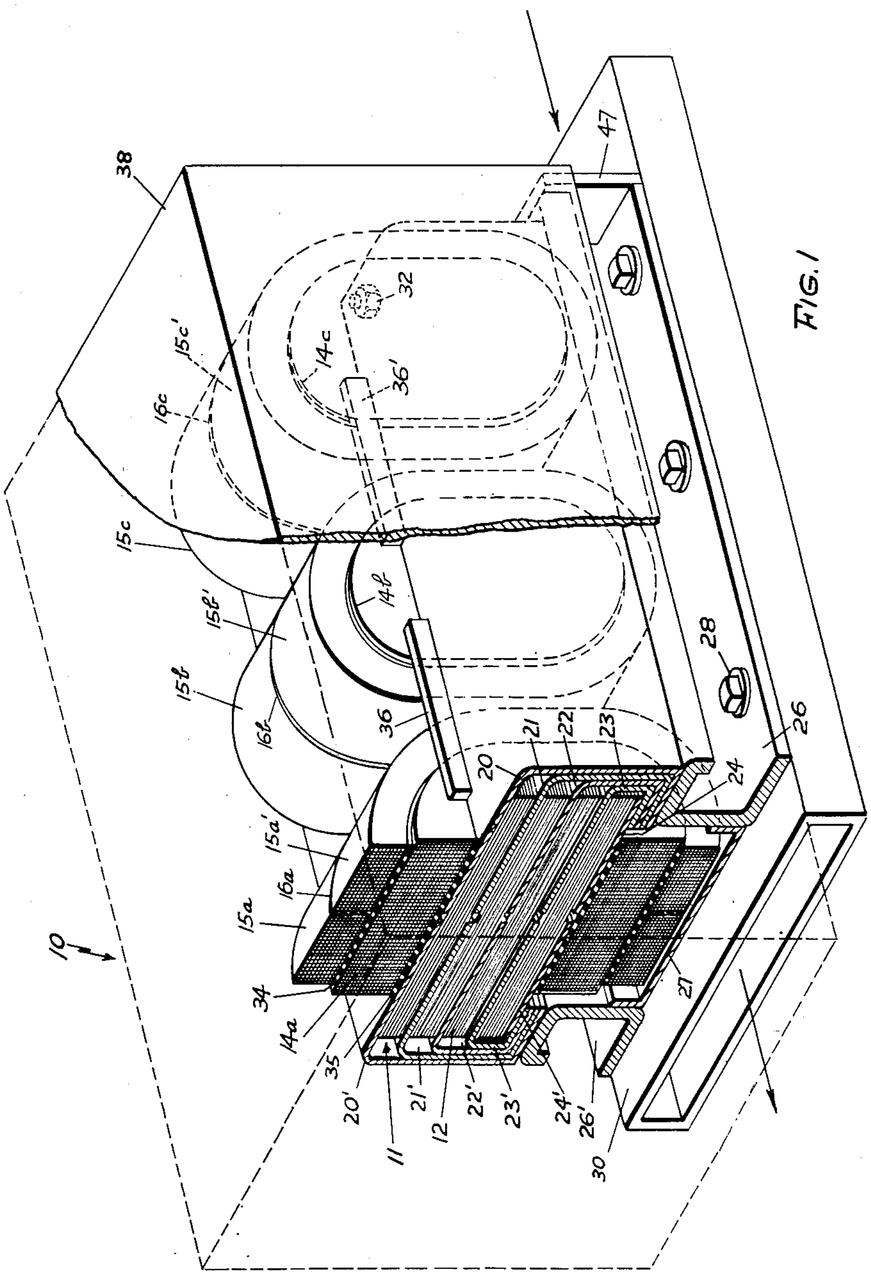
Fig. 1 is a view, partly in section, of an electromagnetic component showing a first embodiment of the invention.

In Fig. 1, an electromagnetic component 10, shown by way of example as a three-phase transformer, includes a core 11 composed of a plurality of stacked laminations 12 which may be of any type of magnetic material commonly used in core design, such as silicon steel. The manner of stacking the core laminations is well known to those skilled in the art and is not a part of applicant's invention. One possible arrangement, exemplified in the drawings, is of the "double-E" type having three spaced legs, only one of which is visible in Fig. 1. The middle leg, whose core structure is identical to that of Fig. 1, is visible, however, in Fig. 4. Another possible arrangement consists of a plurality of E-shaped laminations closed by an abutting stack of I-shaped laminations of equal thickness.

The three coil assemblies will be indicated by the small letters *a*, *b* and *c* attached to the appropriate reference numerals. The primary winding coils 14*a*, 14*b* and 14*c* and a dual secondary winding 15*a*, 15*a'*, and so forth, surround each of the three legs of the magnetic core. The secondary winding is divided into two separate windings 15*a*, 15*a'*, and so forth, because of the high voltages involved in the secondary winding; the secondary winding may, however, be a unitary winding if the voltage is sufficiently low. A spacer 16 of electrically-insulating material is inserted between the two sections of the secondary winding.

A pair of thermally-conductive laminations 20 and 20' which are preferably made of copper sheet or foil are placed over the top surface of the magnetic core and bent around the side surfaces of the core in the manner shown in Fig. 1. Laminations 21, 22 and 23 and 21', 22' and 23' are inserted between core laminations, as shown in Fig. 1, and bent around the sides of the core in the same manner as laminations 20 and 20'. A pair of copper laminations 24 and 24' are positioned in contact with the bottom surface of core 11. The laminations are arranged in pairs so that the inner end of each pair may be spaced apart to form a small gap. In this way, closed electrically-conductive turns in the transformer are avoided.

The outer ends of each of said copper laminations are in contact over a large surface area with adjacent laminations in the manner clearly shown in Fig. 1.

The outermost copper layers 20 and 20' are, in turn, in contact with the top face of rigid mounting members 26 and 26', respectively; these members, shown in the form of channels, are joined together, as by soldering, by means of end plates 47 and by means of bottom cover 27 to provide a rigid mounting assembly. Through mounting, bolts 32 clamp the core laminations 12 and heat conductors 20, 21, 22, 23 and 24 to the rigid mounting members 26 and 26'. The bases of channel members 26 and 26' are attached by fastening means 28 to a cooling plate 30.

Figures 2, 3, 4:
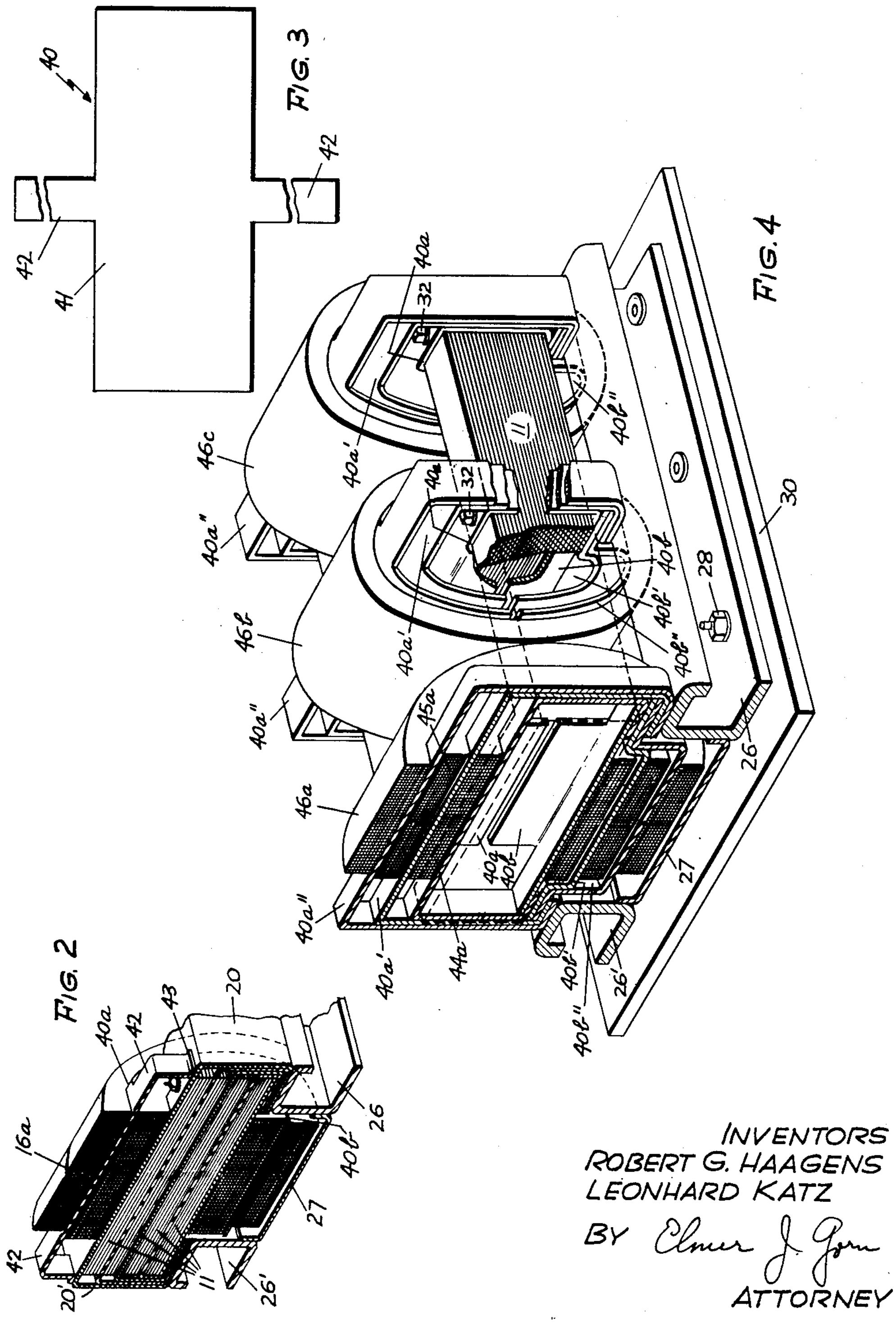
Fig. 2 is a fragmentary view showing a second embodiment of the invention.
Fig. 3 is a plan view of a thermally-conductive lamination used in the embodiments shown in Figs. 2 and 4.
Fig. 4 is a view, partly in section, of a third embodiment of the invention.

Plate 30 is shown in Fig. 1 as a hollow plate through which a cooling fluid is caused to flow, as indicated by the arrows. Another form of cooling plate, which is shown in Fig. 4, may be used in lieu of the plate shown in Fig. 1. This plate is merely a thin, flat plate made of a material, such as copper or aluminum, having a high thermal conductivity. It is further possible to utilize a flat cooling plate of the type shown in Fig. 4 to which is soldered or otherwise fastened an arrangement of ducts of restricted cross section through which a coolant is caused to flow.

Electrically-insulating strips 34 and 35 are positioned between the primary and secondary windings of each coil assembly and between the outer laminations 20, 20' and the primary windings, respectively.

Electrically-insulating wedges 36 and 36′ are inserted in the spaces between adjacent core legs to prevent possible breakdown between the electrical windings of adjacent coil assemblies.

The heat generated within the transformer is transferred by way of conduction through the various copper layers to the respective mounting surfaces 26 and 26′ and thence to cooling plate 30. It will be noted that the cross-sectional area of the heat transfer path commencing with the top laminations 20 and 20′ increases as more and more laminations are joined together until, at the region of jointure of the outer ends thereof, the cross-sectional area is a maximum.

The transformer assembly is closed by a top cover 38 which is seam soldered to the mounting surfaces to form an oil-tight joint. The space within case 38 unoccupied by the transformer assembly is filled with oil, sand and oil, or any suitable filler. It should be understood, however, that the case may be dispensed with in applications where high voltage breakdown problems are not serious.

Although the device shown in Fig. 1 contains three winding assemblies, the invention is not limited to a device having three sets of windings and three core legs, but any number of separate winding assemblies and legs may be used.

The device of Fig. 2 is similar to that of Fig. 1 except that a compound copper cooling layer 40*a*, 40*b* is introduced between the primary and secondary windings of each coil, in addition to the copper laminations in the magnetic core. Only one coil assembly is shown in Fig. 2, since the other two assemblies are identical. Furthermore, the cooling plate 30, to which the thermally-conductive mounting surfaces 26 and 26′ are attached, is also omitted for the sake of clarity. The copper layer 40*a*, 40*b* comprises two sections, each adapted to surround substantially one half of the primary windings. Each section is stamped out or cut from foil or a thin metal sheet of thermally-conductive material, such as copper, and is cruciform, as shown in Fig. 3. Each section 40 has a substantially rectangular body portion 41 and a pair of tabs 42 extending from opposite sides of the body; the body portion is bent to conform to the periphery of the primary winding. A flanged portion 43 of each tab is tinned and soldered to the outer surface of the outermost copper laminations 20, 20′. The lower section of the copper layer is identical to the upper section and it is likewise fastened to the outer surface of laminations 20, 20′ near the ends of said laminations.

In the assembly shown in Fig. 4, two primary windings 44*a* and 45*a* are wounded about one leg of core 11; winding 45*a* is surrounded by a dual secondary winding 46*a*. Two other similar sets of windings 44*b*, 45*b*, 46*b* and 44*c*, 45*c* and 46*c* are wound about the remaining two legs of the E-shaped core 11.

In Fig. 4, the transformer is cooled by means of thermally-conductive laminations external to the magnetic core. These laminations are of the shape shown in Fig. 3 and described previously. The body portion 41 of laminations 40*a* and 40*b* are bent around the outside of the magnetic core or the periphery of the coils, as indicated in Fig. 4. The tabs are bent so that the ends of each tab may be connected together in a manner shown in Fig. 1 and described previously. The laminations are arranged in pairs to completely surround the core or coils, as the case may be, except for two oppositely positioned small gaps; these gaps are provided in order to avoid the formation of undesirable shorted electrically conducting turns in the transformer. A first pair of laminations 40*a*, 40*b* is adapted to surround one leg of core 11 which is shown dotted in Fig. 4 in order to clearly illustrate the copper laminations. A second pair of laminations 40*a*′, 40*b*′ is wound over the innermost primary winding 44, while a third pair of laminations 40*a*″ and 40*b*″ is inserted between the outermost primary winding 45 and secondary winding 46. Three pairs of laminations are similarly positioned in the other two coil assemblies and corresponding pairs are labelel by the same reference numerals. The number and arrangement of the copper laminations are dependent, of course, upon the particular transformer or electromagnetic component involved. It is obviously possible to hermetically enclose the transformer of Fig. 4 in the manner shown in Fig. 1 in applications requiring a higher heat handling capacity or greater insulating properties.

This invention is not limited to the particular details of construction, materials and processes described, as many equivalents will suggest themselves to those skilled in the art. It is accordingly desired that the appended claims be given a broad interpretation commensurate with the scope of the invention within the art.

What is claimed is:

1. In an electromagnetic component having a laminated magnetic core and at least one current-carrying winding surrounding said core, a first set of thermally-conductive spaced laminations and a second set of thermally-conductive spaced laminations, said laminations of said first and second sets being positioned between said core laminations and having outer portions located externally of said core, said outer portions of said first set of laminations being connected together to form a first heat-conductive path on one side of said laminated core, said outer portions of said second set of laminations being connected together to form a second heat-conductive path on the other side of said laminated core, said heat-conductive paths being of gradually increasing cross-section in the direction away from said core, each of said laminations of said first set having one end thereof spaced from the said corresponding end of each of said laminations of said second set to prevent closed electrically-conductive paths in said component, and a heat sink exposed to a circulating cooling fluid and thermally connected to said first and second heat-conductive paths.

2. In an electromagnetic component having a laminated magnetic core and at least one current-carrying winding surrounding said core, a first set and a second set of thermally-conductive spaced laminations, said laminations of said first and second sets being positioned between said core laminations, a third set and a fourth set of thermally-conductive laminations substantially surrounding said core and positioned in thermal contact with said winding, said laminations of said sets having outer portions located externally of said core, said outer portions of said first and third sets of laminations being connected together to form a first heat-conductive path on one side of said laminated core, said outer portions of said second and fourth sets of laminations being connected together to form a second heat-conductive path on the other side of said laminated core, said heat-conductive paths being of gradually increasing cross-section in the direction away from said core, each of said laminations of said first set having one end thereof spaced from the corresponding end of each of the laminations of said second set and each of said laminations of said third set having one end thereof spaced from the corresponding end of each of said laminations of said fourth set to prevent closed electrically-conductive paths in said component, and a heat sink exposed to a circulating cooling fluid and thermally connected to said first and second heat-conductive paths.

3. In an electromagnetic component having a laminated magnetic core and at least one winding assembly each including a primary winding and a secondary winding surrounding said core, a first set and a second set of thermally-conductive spaced laminations, said laminations of said first and second sets being positioned between said core laminations and having outer portions located externally of said core, each of said laminations of said first set having one end thereof spaced from the corresponding end of each of the laminations of said second set, a thermally-conductive sheet having a major portion substantially disposed between said windings of each winding assembly and in thermal contact therewith, said sheet further having a pair of oppositely-disposed tab portions extending substantially perpendicular to said major portions and externally of said winding assembly, the ends of said major portions being spaced to prevent a closed electrically-conductive path in said component, said outer portions of said first set of laminations and one of said tab portions being connected together to form a first heat-conductive path on one side of said laminated core, said outer portions of said second set of laminations and the other of said tab portions being connected together to form a second heat-conductive path on the other side of said laminated core, said heat-conductive paths being of gradually increasing cross-section in the direction away from said core, and a heat sink exposed to a circulating cooling fluid thermally connected to said first and second heat-conductive paths.

4. In an electromagnetic component having a laminated magnetic core, at least one primary winding and one secondary winding surrounding said core, a first set and a second set of thermally-conductive spaced laminations, said laminations of said first and second sets being positioned between said core laminations, each of said laminations of said first set having one end thereof spaced from a corresponding end of each of the laminations of said second set, a third set and a fourth set of thermally-conductive laminations surrounding said core and positioned in thermal contact with said winding, each of said laminations of said third set having one end thereof spaced from the corresponding end of each of the laminations of said fourth set, said laminations of said sets having outer portions located externally of said core, a thermally-conductive sheet having a major portion substantially disposed between said windings of each winding assembly and in thermal contact therewith, said sheet further having a pair of oppositely-disposed tab portions extending substantially perpendicular to said major portions and externally of said winding assembly, the ends of said major portion being spaced apart to prevent a closed electrically-conductive loop in said component, said outer portions of said first and third sets of laminations and one of said tab portions on said sheet being connected together to form a first heat-conductive path on one side of said laminated core, said outer portions of said second and fourth sets of laminations and the other of said tab portions of said sheet being connected together to form a second heat-conductive path on the other side of said laminated core, said heat-conductive paths being of gradually increasing cross-section in the direction away from said core, and a heat sink exposed to a circulating cooling fluid and thermally connected to said first and second heat-conductive paths.

References Cited in the file of this patent

UNITED STATES PATENTS

| | | |
|---|---|---|
| 1,385,624 | Kent | July 26, 1921 |
| 1,602,043 | Pfiffner | Oct. 5, 1926 |
| 2,151,787 | Marbury et al. | Mar. 28, 1939 |
| 2,200,094 | Marbury | May 7, 1940 |

FOREIGN PATENTS

| | | |
|---|---|---|
| 166,613 | Great Britain | July 28, 1921 |
| 467,804 | Great Britain | June 23, 1937 |
| 648,697 | Great Britain | Jan. 10, 1951 |
| 648,736 | Great Britain | Jan. 10, 1951 |
| 895,627 | Germany | Nov. 5, 1953 |